US012686772B2

(12) United States Patent
Takei et al.

(10) Patent No.: US 12,686,772 B2
(45) Date of Patent: Jul. 21, 2026

(54) MODIFIED METAL OXIDE PARTICLE MATERIAL AND METHOD FOR PRODUCING SAME

(71) Applicant: ADMATECHS CO., LTD., Miyoshi (JP)

(72) Inventors: Kenta Takei, Miyoshi (JP); Yuri Aoki, Miyoshi (JP); Yusuke Watanabe, Miyoshi (JP); Nobutaka Tomita, Miyoshi (JP)

(73) Assignee: ADMATECHS CO., LTD., Aichi (JP)

( * ) Notice: Subject to any disclaimer, the term of this patent is extended or adjusted under 35 U.S.C. 154(b) by 788 days.

(21) Appl. No.: 17/965,027

(22) Filed: Oct. 13, 2022

(65) Prior Publication Data

US 2023/0046554 A1 Feb. 16, 2023

Related U.S. Application Data

(63) Continuation of application No. PCT/JP2021/015535, filed on Apr. 15, 2021.

(30) Foreign Application Priority Data

Apr. 17, 2020 (WO) .................. PCT/JP2020/016935

(51) Int. Cl.
*C09C 1/30* (2006.01)
*C09C 3/12* (2006.01)

(52) U.S. Cl.
CPC .............. *C09C 1/3081* (2013.01); *C09C 3/12* (2013.01); *C01P 2004/61* (2013.01); *C01P 2004/62* (2013.01); *C01P 2004/64* (2013.01)

(58) Field of Classification Search
None
See application file for complete search history.

(56) References Cited

U.S. PATENT DOCUMENTS

| | | | |
|---|---|---|---|
| 11,401,423 B2 | 8/2022 | Noguchi et al. | |
| 2017/0226418 A1* | 8/2017 | Otsuka ................. | H10H 20/854 |
| 2020/0115529 A1 | 4/2020 | Harada et al. | |
| 2021/0238421 A1 | 8/2021 | Noguchi et al. | |

FOREIGN PATENT DOCUMENTS

| | | |
|---|---|---|
| CN | 110785860 A | 2/2020 |
| JP | 2017115111 A | 6/2017 |
| JP | 6603777 | 11/2019 |
| WO | WO-2019026962 A1 | 2/2019 |

OTHER PUBLICATIONS

English translation of Harada et al. (WO 2019/026962). (Year: 2019).*
Combined Chinese Office Action and Search Report issued Jul. 20, 2023 in Application No. 2021180023951.9 (with machine English translation), 24 pages.
Combined Taiwanese Office Action and Search Report issued Dec. 11, 2024, in corresponding Taiwanese Patent Application No. 110113780 (with machine English translation), 12 pages.
International Search Report issued Jul. 13, 2021 in PCT/JP2021/015535 (with English translation), 5 pages.
Written Opinion issued Jul. 13, 2021 in PCT/JP2021/015535 (with English translation), 9 pages.

* cited by examiner

*Primary Examiner* — Ronak C Patel
(74) *Attorney, Agent, or Firm* — Element IP, PLC

(57) ABSTRACT

A modified metal oxide particle material includes: a metal oxide particle material having, on a surface thereof, a functional group other than a phenyl group; and a modifying material formed of a silicon-containing compound having a phenyl group. The modifying material is adhered to the surface of the metal oxide particle material. When the modified metal oxide particle material is washed with methyl ethyl ketone, a ratio (C/H) of a carbon content C (% by mass) to a surface area H (m²) per 1 g is 0.05 or less, after the washing. The ratio (C/H) is reduced by 0.1 or more, and the modifying material is removed by 50% or more by mass, after the washing compared with before the washing.

16 Claims, No Drawings

MODIFIED METAL OXIDE PARTICLE MATERIAL AND METHOD FOR PRODUCING SAME

TECHNICAL FIELD

The present invention relates to a modified metal oxide particle material that is dispersed in a resin material or an organic solvent and used, and a method for producing the modified metal oxide particle material.

BACKGROUND ART

To date, a resin composition in which a filler material formed of metal oxide is dispersed in a resin material has been used for general purposes. Mechanical characteristics of the resin composition and a cured product of the resin composition are enhanced by dispersing the filler material formed of metal oxide (Patent Literature 1 or the like). The filler material is required to be uniformly dispersed in such a resin composition. In order to obtain such a resin composition, the filler material is dispersed directly in a resin material, or a slurry composition in which the filler material is dispersed in an organic solvent is produced, and the slurry composition is then mixed in a resin material to obtain the resin composition.

CITATION LIST

Patent Literature

Patent Literature 1: JP6603777(B)

SUMMARY OF INVENTION

Technical Problem

The present invention has been made and completed in view of the aforementioned circumstances, and an object of the present invention is to provide a modified metal oxide particle material as a metal oxide particle material having high dispersibility, and a method for producing the modified metal oxide particle material.

Solution to Problem

In order to attain the aforementioned object, the inventors of the present invention have made thorough study. As a result, the inventors of the present invention have found that, in a case where a modified metal oxide particle material in which a modifying material formed of a silicon-containing compound having a phenyl group is previously among the metal oxide particle material is formed and dispersed in this state in a resin material or an organic solvent, the resin material or the organic solvent easily enters the metal oxide particle material to enhance dispersibility, and have completed the invention described below.

That is, in order to attain the aforementioned object, a modified metal oxide particle material according to the present invention includes: a metal oxide particle material having, on a surface, a functional group other than a phenyl group; and a modifying material formed of a silicon-containing compound having a phenyl group, the modifying material being adhered to the surface of the metal oxide particle material.

Particularly, before and after washing with methyl ethyl ketone (MEK), a value of C/H calculated from a carbon content C (% by mass) and a surface area H (m$^2$) per 1 g is changed so as to be reduced by not less than 0.1, and the modifying material is eliminated by not less than 50% by mass.

Particularly, the value of the C/H is preferably not greater than 0.05 after washing.

In order to attain the aforementioned object, another modified metal oxide particle material according to the present invention includes: a metal oxide particle material having, on a surface, a functional group other than a phenyl group; and a modifying material formed of a silicon-containing compound having a phenyl group, the modifying material being adhered to the surface of the metal oxide particle material, and after washing with methyl ethyl ketone, an area at 3000 to 3100 cm$^{-1}$ in IR spectrum is reduced by not less than 90% with respect to an area before washing.

Furthermore, preferably, the silicon-containing compound of the modifying material is a silane compound having a phenyl group, or a condensation product of a silane compound having a phenyl group and a silane compound having a hydrocarbon group that binds directly to Si.

The silane compound having the phenyl group is preferably represented by $((C_6H_5)X)_n$—Si—$OR_{(4-n)}$, and the silane compound having the hydrocarbon group is preferably represented by $R_n$—Si—$OR_{(4-n)}$. (X represents direct binding, —$(CH_2)_q$—, or —O—; q represents an integer of 0 to 3; n represents an integer selected from 1 to 3 independently for each molecule; R represents a C1 to C3 hydrocarbon group selected independently for each functional group.)

The silicon-containing compound that may be a condensation product of the modifying material is preferably represented by general formula (1): R1-O—$(SiZ1Z2O)_n$—$(SiZ3Z4O)_m$—R2.

(In the formula, Z1 represents $(C_6H_5)X$—; Z2 to Z4 each independently represent $(C_6H_5)X$—, a C1 to C3 hydrocarbon group, a C1 to C3 alkoxy group, or —$O_r$—$(CH_2)_p$—$O_t$— that binds to other Z2 to Z4; X represents direct binding, —$(CH_2)_q$—, or —O—; n and p each represent an integer of not less than 1; m represents an integer of not less than 0; q represents an integer that is not less than 0 and each independently selected; r and t are each independently selected from 0 and 1; R1 and R2 are each independently selected from a C1 to C3 hydrocarbon group and a C1 to C3 alkoxy group.)

Furthermore, the metal oxide particle material is preferably subjected to surface treatment with a silane compound. A volume average particle diameter of the modified metal oxide particle material is preferably not less than 0.01 μm and preferably not greater than 5 μm.

In order to attain the aforementioned object, a method for producing the modified metal oxide particle material according to the present invention includes: a surface treatment step of subjecting a metal oxide particle material to surface treatment with a silane compound to produce a surface-treated metal oxide particle material; a dispersion step of dispersing a silicon-containing compound having a phenyl group in a dispersion slurry in which the surface-treated metal oxide particle material is dispersed in a dispersion medium; and a drying step of removing the dispersion medium after the dispersion step, and adhering a modifying material formed of the silicon-containing compound to a surface of the surface-treated metal oxide particle material to produce a modified metal oxide particle material.

Advantageous Effects of Invention

In the modified metal oxide particle material of the present invention, the modifying material is previously among the metal oxide particle material to enhance dispersibility into a resin material or an organic solvent.

DESCRIPTION OF EMBODIMENTS

A modified metal oxide particle material and a method for producing the modified metal oxide particle material according to the present invention will be described below in detail based on an embodiment. The modified metal oxide particle material of the present embodiment is a material that is suitably used as a filler material to be dispersed in a resin material or an organic solvent. Particularly, the modified metal oxide particle material is preferably provided in a dry state. Preferably, by dispersing the modified metal oxide particle material in a resin material and an organic solvent when used, a modifying material adhered to the surface of the modified metal oxide particle material is transferred into the organic solvent or the like to exhibit the effect.
(Modified Metal Oxide Particle Material)

The modified metal oxide particle material of the present embodiment has a surface-treated metal oxide particle material and a modifying material. The modified metal oxide particle material preferably has high sphericity. Preferably, the sphericity is, for example, not less than 0.8, not less than 0.9, not less than 0.95, and not less than 0.99.

The surface-treated metal oxide particle material is a metal oxide particle material having been subjected to surface treatment. Examples of the metal oxide particle material include silica, alumina, zirconia, titania, and composite oxides thereof. Examples of the composite oxide include calcium titanate, barium titanate, and zeolite. Although the particle diameter of the metal oxide particle material is not particularly limited, the metal oxide particle material preferably has a particle size distribution suitable as the filler material. The particle diameter is, for example, not less than 0.01 μm and not greater than 5 μm. As the lower limit value, for example, 0.01 μm, 0.05 μm, 0.1 μm, 0.3 μm, and 0.5 μm are adopted. As the upper limit value, for example, 2 μm, 3 μm, 4 μm, and 5 μm are adopted. The upper limit value and the lower limit value are optionally combined.

The surface-treated metal oxide particle material has a functional group other than a phenyl group on the surface. Examples of the functional group other than a phenyl group include carbon-containing functional groups such as an alkyl group, a vinyl group, an epoxy group, a methacryl group, an amino group, and an isocyanate group. Although a method for introducing such a functional group is not particularly limited, a silane compound having such a functional group is used to subject the metal oxide particle material to surface treatment, thereby introducing the functional group. For example, the silane compound is brought, as it is, into contact with the surface of the metal oxide particle material, or a solution is produced by using a certain solvent to bring the silane compound into contact with the surface. Thereafter, the obtained product is left as it is until the reaction is completed or the obtained product is heated.

In a case where the functional group is introduced by using a silane compound, reaction with and binding to OH groups on the surface of the metal oxide particle material is assumed to occur, and an amount of the OH groups removed by the reaction is preferably not less than 50%, more preferably not less than 70%, even more preferably not less than 90%, and particularly preferably 100%. Phenyl groups may be partially introduced as long as the functional groups other than a phenyl group are introduced.

The modifying material is a material adhered to the surface of the surface-treated metal oxide particle material. The adhesion means that physical adsorption is predominant while an adhered amount by chemical reaction is small. Whether or not physical adsorption is predominant is determined according to whether or not 50% or more (preferably, 70% or more) by mass of the modifying material is eliminated when the modifying material is dispersed in an organic solvent.

Although an amount of the modifying material is not particularly limited, the amount of the modifying material is about 1 mg to 5 mg with respect to a surface area (1 m$^2$) of the surface-treated metal oxide particle material. The lower limit value is, for example, 1 mg and 1.5 mg. The upper limit value is, for example, 3.5 mg, 4 mg, and 5 mg. The upper limit value and the lower limit value are optionally combined.

A part of the modifying material may react with the surface of the surface-treated metal oxide particle material. For example, the modifying material may react in such a range that change between carbon contents before and after the modified metal oxide particle material is washed with MEK is not greater than 0.05% by mass with respect to a surface area (1 m$^2$) per 1 g of the surface-treated metal oxide particle material. Washing is performed under a washing condition that 5 g of the modified metal oxide particle material is put into 35 mL of MEK, and ultrasound is applied for five minutes.

A part of the modifying material may react with the surface of the surface-treated metal oxide particle material. For example, the modifying material may react in such a range that a value of C/H calculated from a carbon content C (% by mass) and a surface area H (m$^2$) per 1 g of the surface-treated metal oxide particle material is not greater than 0.05, and may also react in such a range that the value of C/H is not greater than 0.04, not greater than 0.03, or not greater than 0.02. Washing is performed under a washing condition that 5 g of the modified metal oxide particle material is put into 35 mL of MEK, and ultrasound is applied for five minutes. A kind and an amount of the modifying material are preferably set such that a value of C/H calculated from a carbon content C (% by mass) and a surface area H (m$^2$) per 1 g of the surface-treated metal oxide particle material is changed between before and after washing with MEK, by not less than 0.1, by not less than 0.15, or by not less than 0.2. In the description herein, the carbon content C contains carbon derived from a compound which has the functional group other than a phenyl group and which binds to the surface of the surface-treated metal oxide particle material.

In a case where a silane compound contains one silicon atom, the silane compound preferably has two phenyl groups. For example, the silane compound is diphenyldialkoxysilane. As the alkoxy group, a methoxy group or an ethoxy group is preferable and a methoxy group is particularly preferable. An additive (modifier) having two phenyl groups has high steric hindrance as compared with an additive having one phenyl group, so that dispersibility is enhanced, and the additive is inhibited from firmly binding to the surface of the surface-treated metal oxide particle material due to reduction of reactivity.

As the modifying material, a silane compound having a phenyl group, or a condensation product of a silane compound having a phenyl group and a silane compound having a hydrocarbon group that binds directly to Si is adopted. The condensation product is, for example, produced by mixing and reaction of a silane compound having one silicon atom. For the reaction, a catalyst is preferably added. Examples of the catalyst include alkali substance and noble metal catalysts such as platinum.

For example, examples of the silane compound having a phenyl group include $((C_6H_5)X)_n$—Si—$OR_{(4-n)}$, and examples of the silane compound having a hydrocarbon group include $R_n$—Si—$OR_{(4-n)}$ (X represents direct binding, —$(CH_2)_q$–, or —O—; q represents an integer of 0 to 3; n represents an integer selected from 1 to 3 independently for each molecule; R represents a C1 to C3 hydrocarbon group selected independently for each functional group). X preferably represents direct binding. For example, diphenyl-dialkoxysilane is a compound in which X represents direct binding and n is 2.

Furthermore, as a silicon-containing compound of the modifying material, a silicon-containing compound represented by general formula (1): R1-O—$(SiZ1Z2O)_n$—$(SiZ3Z4O)_m$—R2 is adopted (in the formula, Z1 represents $(C_6H_5)X$—; Z2 to Z4 each independently represent $(C_6H_5)$ X—, a C1 to C3 hydrocarbon group, a C1 to C3 alkoxy group, or —$O_r$—$(CH_2)_p$—$O_t$— that binds to other Z2 to Z4; X represents direct binding, —$(CH_2)_q$—, or —O—; n and p each represent an integer of not less than 1; m represents an integer of not less than 0; q represents an integer that is not less than 0 and each independently selected; r and t are each independently selected from 0 and 1; R1 and R2 are each independently selected from a C1 to C3 hydrocarbon group and a C1 to C3 alkoxy group).

In another method for determining a kind and a content of the modifying material, an added amount and a kind of the modifying material are adopted such that change between IR spectrum of the modified metal oxide particle material of the present embodiment and IR spectrum obtained after the modified metal oxide particle material is washed with MEK as described above is great. That is, a kind and an amount of the modifying material are preferably selected such that the modifying material does not bind to the surface of the surface-treated metal oxide particle material and is removed by washing. The modifying material is determined to be removed by washing, for example, when 50% or more (preferably, 70% or more) by mass of the modifying material is removed, when 50% or more (preferably, 70% or more) of the modifying material is removed with respect to a mass of carbon on the surface, or when change between IR spectrum of the surface-treated metal oxide particle material and IR spectrum obtained after washing is great. The kind and the process amount of the modifying material are determined so as to satisfy at least one of these criteria.

Specifically, "change in IR spectrum is great" means that, after the modifying material is removed by washing, an area of a peak (3000 to 3100 $cm^{-1}$) corresponding to a phenyl group is reduced by not less than 90% with respect to an area before the washing. In a case where change in IR spectrum is great, the modifying material is determined to be not firmly bound to the surface of the surface-treated metal oxide particle material.

(Method for Producing Modified Metal Oxide Particle Material)

A method for producing the modified metal oxide particle material of the present embodiment includes a surface treatment step, a dispersion step, and a drying step.

In the surface treatment step, a metal oxide particle material is subjected to surface treatment with a silane compound, to produce a surface-treated metal oxide particle material. The method for producing the metal oxide particle material is, but is not particularly limited to, a VMC method (vaporized metal combustion method), a melting method, or the like. The metal oxide particle material produced by a VMC method is high density, and low hygroscopicity and excellent electric characteristics. The VMC method is a method for producing a metal oxide particle material by putting and burning particles formed of metals that are constituents of metal oxide particle materials in flame in an oxidation atmosphere.

In the surface treatment step, a functional group other than a phenyl group is introduced onto the surface. As long as a functional group other than a phenyl group is introduced, a phenyl group may be added and introduced. As a method for introducing the functional group, surface treatment is preferably performed with a silane compound having a functional group to be introduced. The surface treatment is performed by bringing a surface treatment agent having a functional group to be introduced into contact with the surface of the metal oxide particle material. The contact is performed by bringing a surface treatment agent in the form of liquid or gas as it is into contact with the surface of the metal oxide particle material, or by using a solution in which a surface treatment agent in the form of liquid or gas is dissolved in a certain solvent. Although an amount of the surface treatment agent is not particularly limited, the amount is adopted such that an amount of OH groups on the surface of the metal oxide particle material indicates the above-described residual rate.

In the dispersion step, the surface-treated metal oxide particle material is dispersed in a dispersion medium to form a dispersion slurry, and a silicon-containing compound is dispersed in the dispersion slurry. The silicon-containing compound and an amount of the silicon-containing compound as described above for the modified metal oxide particle material of the present embodiment may be adopted.

Examples of the dispersion medium of the dispersion slurry include MEK, isopropyl alcohol, propylene glycol monomethyl ether acetate, cyclohexanone, methyl isobutyl ketone, toluene, N-methylpyrrolidone, N-ethylpyrrolidone, and gamma butyrolactone. A content of the surface-treated metal oxide particle material contained in the dispersion slurry is, but is not particularly limited to, about 10% to 80% with respect to the total mass. As the lower limit value, 10%, 30%, and 50% are adopted. As the upper limit value, 60%, 70%, and 80% are adopted. The upper limit value and the lower limit value are optionally combined.

When the dispersion slurry is prepared and the modifying material is dispersed in the dispersion slurry, a stirring/shearing force may be applied or ultrasound may be applied.

In the drying step, the dispersion medium is removed. A method for removing the dispersion medium is, but is not particularly limited to, a method using heating, or the like. Pressure may be reduced during heating. In heating, spray drying using a disc rotor or a pressure nozzle may be adopted.

The silicon-containing compound is transformed to the modifying material through the drying. The modifying material may be dissolved in the dispersion medium or may not be dissolved in the dispersion medium. In a case where the modifying material is dissolved, the modifying material is deposited and formed into particles according to the dispersion medium being dried. In a case where the silicon-containing compound is not dissolved in the dispersion medium, the silicon-containing compound is adhered as it is to the surface of the surface-treated metal oxide particle material.

EXAMPLES

The modified metal oxide particle material and the method for producing the modified metal oxide particle material according to the present invention will be described below in detail based on examples.

Test 1

(Preparation of Sample)

Surface treatment was performed using 1.5 parts by mass of KBM-1003 (manufactured by Shin-Etsu Chemical Co., Ltd.: vinyltrimethoxysilane) with respect to 100 parts by mass of spherical silica (manufactured by Admatechs Company Limited, SO-C1; volume average particle diameter of 0.25 μm; produced by the VMC method) as the metal oxide particle material, to obtain a surface-treated metal oxide particle material. The surface-treated metal oxide particle material had vinyl groups introduced onto the surface (surface treatment step).

A dispersion slurry was prepared by mixing 60 parts by mass of the surface-treated metal oxide particle material and 40 parts by mass of methyl ethyl ketone (MEK). A silicon-containing compound (manufactured by Shin-Etsu Chemical Co., Ltd., specified by product No. Confirmed in a catalogue for a functional group contained) indicated in Table 1 was added by 3 mg per a surface area (1 m²) of the surface-treated metal oxide particle material contained in the dispersion slurry, and dispersed by CLEARMIX CLM-2.2S:

manufactured by M Technique Co., Ltd., (17000 rpm) for two minutes (dispersion step). In Test example 12, the surface-treated metal oxide particle material to which the modifying material used in each of Test examples 1 and 3 to 11 was not added was used as a sample as it was (material powder).

Thereafter, the obtained product was dried at 100° C. for two hours (drying step), and the obtained powder was used as a test sample of each of the test examples.

For the test samples of Test examples 1 to 12, a carbon amount before washing (C amount before washing), a carbon amount after washing (C amount after washing), and a carbon amount (C amount of material powder) of the surface-treated metal oxide particle material (material powder) before adhesion of the modifying material after washing with MEK, were measured. A degree of dispersion was also measured by using a grind gauge. Evaluation of a degree of dispersion using a grind gauge is a test based on JIS K 56000-2-5, and a value of a grind gauge represents a value correlating with a particle diameter of an aggregate. That is, a greater value of the grind gauge indicates that a great aggregate is generated. Furthermore, whether or not an additive was firmly bound to the surface of the surface-treated metal oxide particle material was determined from IR spectrum of the modified metal oxide particle material having been washed. The determination was made according to whether or not a peak derived from the additive in addition to IR spectrum of the material powder was in the IR spectrum of the washed sample.

TABLE 1

| | | Test example 1 | Test example 2 | Test example 3 | Test example 4 | Test example 5 | Test example 6 |
|---|---|---|---|---|---|---|---|
| Silicon-containing compound | Product No. (Shin-Etsu Chemical Co., Ltd.) | KBM-202SS | KBM-202SS | KR-9218 | KR-510 | KR-511 | KBM-103 |
| | Form | monomer | monomer | oligomer | oligomer | oligomer | monomer |
| | Functional group | diphenyl | diphenyl | phenyl & methyl | phenyl & methyl | phenyl & vinyl | phenyl |
| Grind gauge (μm) | | 12.5 | 15 | 7.5 | 5 | 10 | 5 |
| Particle diameter (μm) | | 0.25 | 0.52 | 0.25 | 0.25 | 0.25 | 0.25 |
| Specific surface area (m²/g) | | 11.6 | 5.4 | 11.6 | 11.6 | 11.6 | 11.6 |
| C amount (%) before washing | | 2.20 | 1.75 | 2.02 | 1.72 | 1.83 | 1.37 |
| C amount (%) after washing | | 0.19 | 0.21 | 0.25 | 0.28 | 0.25 | 0.37 |
| Difference (%) between C amount before washing and C amount after washing | | 2.01 | 1.54 | 1.76 | 1.44 | 1.57 | 1.00 |
| Difference {%/(m²/g)} between C amount before washing and C amount after washing per specific surface area | | 0.17 | 0.29 | 0.15 | 0.12 | 0.14 | 0.09 |
| Binding of additive to surface | | not bound | not bound | not bound | not bound | not bound | bound |

| | | Test example 7 | Test example 8 | Test example 9 | Test example 10 | Test example 11 | Test example 12 |
|---|---|---|---|---|---|---|---|
| Silicon-containing compound | Product No. (Shin-Etsu Chemical Co., Ltd.) | X-40-9296 | KR-516 | X-40-9246 | diphenylmethane | triphenylmethanol | material powder before addition of additive |
| | Form | oligomer | oligomer | oligomer | monomer | monomer | — |
| | Functional group | methacryl & methyl | epoxy & methyl | methyl | diphenyl | triphenyl | not contained |
| Grind gauge (μm) | | >25 | >25 | 17.5 | 17.5 | 17.5 | >25 |
| Particle diameter (μm) | | 0.25 | 0.25 | 0.25 | 0.25 | 0.25 | 0.25 |

TABLE 1-continued

| Specific surface area (m²/g) | 11.6 | 11.6 | 11.6 | 11.6 | 11.6 | 11.6 |
|---|---|---|---|---|---|---|
| C amount (%) before washing | not measured | not measured | not measured | 0.99 | 3.49 | 0.24 |
| C amount (%) after washing | not measured | not measured | not measured | 0.26 | 0.25 | 0.15 |
| Difference (%) between C amount before washing and C amount after washing | — | — | — | 0.73 | 3.24 | 0.09 |
| Difference {%/(m²/g)} between C amount before washing and C amount after washing per specific surface area | — | — | — | 0.06 | 0.28 | 0.01 |
| Binding of additive to surface | not measured | not measured | not measured | not bound | not bound | — |

As is apparent from Table 1, in Test examples 1 to 6 in which a phenyl group was contained, a value of the grind gauge indicated a small value of not greater than 15 μm, and generation of aggregate was inhibited. Meanwhile, in Test examples 7 to 12, the value of the grind gauge was greater than 15 μm, and generation of great aggregate was confirmed.

Particularly, as in Test examples 3 and 4, by adopting the modifying material in which a methyl group in addition to a phenyl group was contained, generation of aggregate was found to be inhibited. According to comparison between diphenyl and phenyl as a functional group of the modifying material, although a value of the grind gauge was less for phenyl (Test example 6) than diphenyl (Test example 1), a value of the C amount (carbon amount) after washing for diphenyl (Test example 1) was closer to the C amount after washing of material powder (the difference was 0.02% in Test example 1 and the difference was 0.22% in Test example 6).

That is, action (transfer into an organic solvent without chemically binding to the surface of the surface-treated metal oxide particle material) as the modifying material was found to be superior in diphenyl of Test example 1. This was also supported by a result (whether or not an additive was firmly bound to the surface) determined from IR spectrum.

Test 2

In Test example 13, an added amount of the additive (KR-9218) was 6.8 mg per a surface area (1 m²) of the surface-treated metal oxide particle material contained in the dispersion slurry. In Test example 14, an added amount of the additive (KR-9218) was 0.6 mg per a surface area (1 m²) of the surface-treated metal oxide particle material contained in the dispersion slurry. The same examination as in Test 1 was performed for Test examples 13 and 14 together with the sample of Test example 3. Table 2 indicates the results.

TABLE 2

| | | Test example 3 | Test example 13 | Test example 14 |
|---|---|---|---|---|
| Silicon-containing compound | Product No. (Shin-Etsu Chemical Co., Ltd.) | KR-9218 | ← | ← |
| | Form | oligomer | ← | ← |
| | Functional group | phenyl & methyl | ← | ← |
| | Added amount (mg/m²) per surface area | 3 | 6.8 | 0.6 |
| Grind gauge (μm) | | 12.5 | 17.5 | >25 |
| Particle diameter (μm) | | 0.25 | ← | ← |
| Specific surface area (m²/g) | | 11.6 | 11.6 | 11.6 |

As is apparent from Table 2, in Test examples 13 and 14 in which the added amount of the additive (silicon-containing compound) was increased and decreased, respectively, dispersibility deteriorated as compared with Test example 3. Although the cause of the deterioration of dispersibility was not clear in detail, excessive increase of the added amount as in Test example 13 was assumed to cause progress of polymerization in the additive and reduce solubility into an organic solvent, and excessive decrease of the added amount as in Test example 14 was assumed to reduce an amount among particles.

Test 3

Test Examples 15 and 16: Preparation of Sample

Surface treatment was performed using 1.0 part by mass of KBM-1003 with respect to 100 parts by mass of alumina (manufactured by Admatechs Company Limited, AO-502; volume average particle diameter of 0.2 μm) as the metal oxide particle material, to obtain a surface-treated metal oxide particle material. The surface-treated metal oxide particle material had a functional group introduced onto the surface (surface treatment step).

A dispersion slurry was prepared by mixing 60 parts by mass of the surface-treated metal oxide particle material and 40 parts by mass of MEK. Dimethoxydiphenylsilane (silicon-containing compound; manufactured by Shin-Etsu Chemical Co., Ltd., KBM-202SS) was added by 3 mg per a surface area (1 m$^2$) of the surface-treated metal oxide particle material contained in the dispersion slurry, and stirred and dispersed well (dispersion step). The obtained particle material was used for a test sample of Test example 15. As a test sample of Test example 16, the surface-treated metal oxide particle material (obtained by merely performing the surface treatment step) to which the modifying material used in Test example 15 was not added was used as it was (material powder).

Thereafter, the obtained product was dried at 100° C. for two hours (drying step), and the obtained powder was used as the test sample of Test example 15.

For the test samples of Test examples 15 and 16, similarly to Test 1, a carbon amount before washing (C amount before washing), a carbon amount after washing (C amount after washing), and a carbon amount (C amount of material powder) of the surface-treated metal oxide particle material (material powder) before adhesion of the modifying material after washing with MEK, were measured. A degree of dispersion was also measured by using a grind gauge. Furthermore, whether or not the additive was firmly bound to the surface of the surface-treated metal oxide particle material was determined from IR spectrum of the modified metal oxide particle material having been washed. The determination was made according to whether or not a peak derived from the additive in addition to IR spectrum of the material powder was in IR spectrum of the washed sample. Table 3 indicates the results.

TABLE 3

| | | Test example 15 | Test example 16 |
|---|---|---|---|
| Silicon-containing compound | Product No. (Shin-Etsu Chemical Co., Ltd.) | KBM-20255 | Material powder before addition of additive |
| | Form | monomer | — |
| | Functional group | diphenyl | not contained |
| Grind gauge (μm) | | 88 | not less than 100 |
| Particle diameter (μm) | | 0.18 | 0.18 |
| Specific surface area (m$^2$/g) | | 7.0 | 7.0 |
| C amount (%) before washing | | 0.60 | 0.13 |
| C amount (%) after washing | | 0.18 | 0.10 |
| Difference (%) between C amount before washing and C amount after washing | | 0.42 | 0.03 |
| Difference {%/(m$^2$/g)} between C amount before washing and C amount after washing per specific surface area | | 0.70 | 0.22 |
| Binding of additive to surface | | not bound | — |

As is apparent from Table 3, in Test example 15 in which the modifying material having a phenyl group was added, a value of the grind gauge indicated a smaller value of 88 μm as compared with Test example 16 in which the modifying material was not added and the value of the grind gauge was not less than 100 μm, and generation of aggregate was apparently inhibited. Furthermore, a result of determination from IR spectrum indicated that the modifying material was not firmly bound to the surface.

The invention claimed is:

1. A modified metal oxide particle material comprising:
a metal oxide particle material having, on a surface thereof, a functional group other than a phenyl group; and
a modifying material formed of a silicon-containing compound having a phenyl group, the modifying material being adhered to the surface of the metal oxide particle material, wherein
when the modified metal oxide particle material is washed with methyl ethyl ketone, a ratio (C/H) of a carbon content C (% by mass) to a surface area H (m$^2$) per 1 g is 0.05 or less after the washing, and the ratio (C/H) is reduced by 0.1 or more, and the modifying material is removed by 50% or more by mass, after the washing compared with before the washing, and the silicon-containing compound of the modifying material is a silane compound having a phenyl group, or a condensation product of a silane compound having a phenyl group and a silane compound having a hydrocarbon group that binds directly to Si.

2. The modified metal oxide particle material according to claim 1, wherein
the silane compound having the phenyl group is represented by $((C_6H_5)X)_n$—Si—$OR_{(4-n)}$, and
the silane compound having the hydrocarbon group is represented by $R_n$—Si-$OR_{(4-n)}$,
wherein, X represents a direct bond, —$(CH_2)_q$—, or —O—; q represents an integer of 0 to 3; n represents an integer of 1 to 3 selected independently for each molecule of the silane compound; R independently represents a C1 to C3 hydrocarbon group.

3. The modified metal oxide particle material according to claim 1, wherein the silicon-containing compound of the modifying material is represented by formula (1): R1-O—$(SiZ1Z2O)_n$—$(SiZ3Z4O)_m$—R2,
wherein, in the formula (1), Z1 represents $(C_6H_5)X$—; Z2 to Z4 each independently represent $(C_6H_5)X$—, a C1 to C3 hydrocarbon group, a C1 to C3 alkoxy group, or at least two of Z2 to Z4 taken together represent —$O_r$—$(CH_2)_p$—$O_t$—; X represents a direct bond, —$(CH_2)_q$—, or —O—; n and p each represent an integer of 1 or more; m represents an integer of 0 or more; q independently represents an integer of 0 or more; r and t are each independently 0 or 1; R1 and R2 are each independently a C1 to C3 hydrocarbon group or a C1 to C3 alkoxy group.

4. The modified metal oxide particle material according to claim 1, wherein the metal oxide particle material is subjected to surface treatment with a silane compound.

5. The modified metal oxide particle material according to claim 1, wherein a volume average particle diameter of the modified oxide particle material is not less than 0.01 μm and not greater than 5 μm.

6. A modified metal oxide particle material comprising:
a metal oxide particle material having, on a surface thereof, a functional group other than a phenyl group; and
a modifying material formed of a silicon-containing compound having a phenyl group, the modifying material being adhered to the surface of the metal oxide particle material, wherein
when the modified metal oxide particle material is washed with methyl ethyl ketone, an area at 3000 to 3100 cm$^{-1}$ in IR spectrum is reduced after the washing by 90% or more with respect to an area at 3000 to 3100 cm$^{-1}$ in IR spectrum before the washing and the silicon-containing compound of the modifying material is a silane compound having a phenyl group, or a condensation product of a silane compound having a phenyl group and a silane compound having a hydrocarbon group that binds directly to Si.

7. The modified metal oxide particle material according to claim 6, wherein the silane compound having the phenyl group is represented by $((C_6H_5)X)_n$—Si—$OR_{(4-n)}$, and the silane compound having the hydrocarbon group is represented by $R_n$—Si—$OR_{(4-n)}$, wherein X represents a direct bond, —$(CH_2)_q$—, or —O—; q represents an integer of 0 to 3; n represents an integer of 1 to 3 selected independently for each molecule of the silane compound; R independently represents a C1 to C3 hydrocarbon group.

8. The modified metal oxide particle material according to claim 6, wherein the silicon-containing compound of the modifying material is represented by formula (1): R1-O—$(SiZ1Z2O)_n$—$(SiZ3Z4O)_m$—R2, wherein, in the formula (1), Z1 represents $(C_6H_5)X$—; Z2 to Z4 each independently represent $(C_6H_5)X$—, a C1 to C3 hydrocarbon group, a C1 to C3 alkoxy group, or at least two of Z2 to Z4 taken together represent —$O_r$—$(CH_2)_p$—$O_t$—; X represents a direct bond, —$(CH_2)_q$—, or —O—; n and p each represent an integer of 1 or more; m represents an integer of 0 or more; q independently represents an integer of 0 or more; r and t are each independently 0 or 1; R1 and R2 are each independently a C1 to C3 hydrocarbon group or a C1 to C3 alkoxy group.

9. The modified metal oxide particle material according to claim 6, wherein the metal oxide particle material is subjected to surface treatment with a silane compound.

10. The modified metal oxide particle material according to claim 6, wherein a volume average particle diameter of the modified oxide particle material is not less than 0.01 μm and not greater than 5 μm.

11. A method for producing the modified metal oxide particle material according to claim 1, the method comprising:

subjecting a metal oxide particle material to surface treatment with a silane compound to produce a surface-treated metal oxide particle material;

dispersing a silicon-containing compound having a phenyl group in a dispersion slurry in which the surface-treated metal oxide particle material is dispersed in a dispersion medium; and removing the dispersion medium from the dispersion slurry such that a modifying material formed of the silicon-containing compound is adhered to a surface of the surface-treated metal oxide particle material to produce the modified metal oxide particle material.

12. A method for producing the modified metal oxide particle material according to claim 2, the method comprising:

subjecting a metal oxide particle material to surface treatment with a silane compound to produce a surface-treated metal oxide particle material;

dispersing a silicon-containing compound having a phenyl group in a dispersion slurry in which the surface-treated metal oxide particle material is dispersed in a dispersion medium; and removing the dispersion medium from the dispersion slurry such that a modifying material formed of the silicon-containing compound is adhered to a surface of the surface-treated metal oxide particle material to produce the modified metal oxide particle material.

13. A method for producing the modified metal oxide particle material according to claim 6, the method comprising:

subjecting a metal oxide particle material to surface treatment with a silane compound to produce a surface-treated metal oxide particle material;

dispersing a silicon-containing compound having a phenyl group in a dispersion slurry in which the surface-treated metal oxide particle material is dispersed in a dispersion medium; and removing the dispersion medium from the dispersion slurry such that a modifying material formed of the silicon-containing compound is adhered to a surface of the surface-treated metal oxide particle material to produce the modified metal oxide particle material.

14. A method for producing the modified metal oxide particle material according to claim 7, the method comprising:

subjecting a metal oxide particle material to surface treatment with a silane compound to produce a surface-treated metal oxide particle material;

dispersing a silicon-containing compound having a phenyl group in a dispersion slurry in which the surface-treated metal oxide particle material is dispersed in a dispersion medium; and removing the dispersion medium from the dispersion slurry such that a modifying material formed of the silicon-containing compound is adhered to a surface of the surface-treated metal oxide particle material to produce the modified metal oxide particle material.

15. A method for producing the modified metal oxide particle material according to claim 3, the method comprising:

subjecting a metal oxide particle material to surface treatment with a silane compound to produce a surface-treated metal oxide particle material;

dispersing a silicon-containing compound having a phenyl group in a dispersion slurry in which the surface-treated metal oxide particle material is dispersed in a dispersion medium; and removing the dispersion medium from the dispersion slurry such that a modifying material formed of the silicon-containing compound is adhered to a surface of the surface-treated metal oxide particle material to produce the modified metal oxide particle material.

16. A method for producing the modified metal oxide particle material according to claim 8, the method comprising:

subjecting a metal oxide particle material to surface treatment with a silane compound to produce a surface-treated metal oxide particle material;

dispersing a silicon-containing compound having a phenyl group in a dispersion slurry in which the surface-treated metal oxide particle material is dispersed in a dispersion medium; and removing the dispersion medium from the dispersion slurry such that a modifying material formed of the silicon-containing compound is adhered to a surface of the surface-treated metal oxide particle material to produce the modified metal oxide particle material.

* * * * *